United States Patent
Lehmann et al.

(10) Patent No.: US 8,645,194 B1
(45) Date of Patent: Feb. 4, 2014

(54) PROCESS IMPACT MATRIX DEVELOPMENT AND UTILIZATION

(75) Inventors: Silke Lehmann, Brokstedt (DE); Peter H. Franz, Esher (GB)

(73) Assignee: Accenture Global Services Limited, Dublin (IE)

( * ) Notice: Subject to any disclaimer, the term of this patent is extended or adjusted under 35 U.S.C. 154(b) by 11 days.

(21) Appl. No.: 13/460,965

(22) Filed: May 1, 2012

Related U.S. Application Data

(60) Provisional application No. 61/482,078, filed on May 3, 2011.

(51) Int. Cl.
   *G06Q 10/00* (2012.01)
   *G06Q 30/00* (2012.01)

(52) U.S. Cl.
   USPC .................. 705/7.38; 705/7.29; 705/7.39

(58) Field of Classification Search
   USPC ...................... 705/7.29, 7.38, 7.39
   See application file for complete search history.

(56) References Cited

U.S. PATENT DOCUMENTS

| | | | |
|---|---|---|---|
| 8,200,527 B1 * | 6/2012 | Thompson et al. | 705/7.39 |
| 2003/0187675 A1 * | 10/2003 | Hack et al. | 705/1 |
| 2004/0103058 A1 * | 5/2004 | Hamilton | 705/38 |
| 2005/0143953 A1 * | 6/2005 | Retsina | 702/182 |
| 2006/0004596 A1 * | 1/2006 | Caniglia et al. | 705/1 |
| 2009/0113427 A1 * | 4/2009 | Brady et al. | 718/100 |
| 2010/0228681 A1 * | 9/2010 | Del Bianco et al. | 705/348 |

\* cited by examiner

*Primary Examiner* — Peter Choi
*Assistant Examiner* — Darlene Garcia-Guerra
(74) *Attorney, Agent, or Firm* — Brinks Gilson & Lione

(57) ABSTRACT

A method of prioritizing processes of an organization includes determining a plurality of processes capable of being performed by the organization, determining a plurality of goals or challenges associated with the organization, and generating a process impact matrix indicating respective impact levels for each process. Each respective impact level is indicative of an impact of each process on each of the plurality of goals or challenges. The method further includes converting each respective impact level to an impact score, determining, for each of the plurality of processes, a relative impact score based on the respective impact levels, and prioritizing each process based on the relative impact scores.

18 Claims, 6 Drawing Sheets

FIG. 3

| Level 1 | Level 2 | Level 3 | Client Value Drivers | | | | | | | | | Average Score |
|---|---|---|---|---|---|---|---|---|---|---|---|---|
| | | | Reduce Operating Cost and NPT | Maximize Asset Utilization and Performance | Ensure / Improve Capital Efficiency | Improve Project Realization and Risk Management | Follow a Regional Focus | Preserve Sustainable Reserve Base | Ensure Regulatory Compliance | Promote HSE Compliance and Social Responsibility | |
| | | | 7% | 12% | 10% | 5% | 5% | 12% | 10% | 6% | 67% |
| Management Processes | Vision and Strategy | Strategic Planning | 1 | 1 | 1 | 1 | 2 | 3 | 1 | 1 | 1.0 |
| Management Processes | Vision and Strategy | Corporate Development | 1 | 2 | 3 | 2 | 3 | 3 | 1 | 1 | 1.4 |
| Management Processes | Vision and Strategy | Portfolio Management | 2 | 1 | 2 | 1 | 1 | 2 | 1 | 1 | 1.0 |
| Management Processes | Vision and Strategy | Research & Development | 1 | 2 | 1 | 1 | 1 | 2 | 1 | 1 | 0.9 |
| Management Processes | External Relationships | Shareholder Management | 1 | 1 | 2 | 1 | 2 | 2 | 1 | 1 | 0.9 |
| Management Processes | External Relationships | Public Relationships | 1 | 1 | 1 | 1 | 1 | 1 | 1 | 1 | 0.7 |
| Management Processes | External Relationships | Legal and Ethical Issues | 1 | 1 | 2 | 2 | 3 | 1 | 3 | 2 | 1.1 |
| Management Processes | External Relationships | Tax Issues | 1 | 1 | 2 | 1 | 2 | 1 | 3 | 1 | 1.0 |
| Management Processes | Improve and Change | Business Process Management | 3 | 2 | 3 | 2 | 1 | 3 | 3 | 1 | 1.6 |
| Management Processes | Improve and Change | Project Management | 3 | 2 | 2 | 3 | 1 | 1 | 3 | 1 | 1.1 |
| Management Processes | Improve and Change | Organisational Design & Development | 2 | 1 | 2 | 2 | 2 | 1 | 3 | 1 | 1.1 |
| Management Processes | Improve and Change | OHSE Management | 1 | 1 | 2 | 3 | 1 | 1 | 3 | 3 | 1.2 |
| Core Processes | Pathfinding / New Ventures | Conduct Studies | 1 | 1 | 3 | 3 | 3 | 3 | 1 | 1 | 1.3 |
| Core Processes | Pathfinding / New Ventures | Evaluate Asset Opportunities | 2 | 1 | 3 | 3 | 3 | 3 | 1 | 1 | 1.4 |

300

302

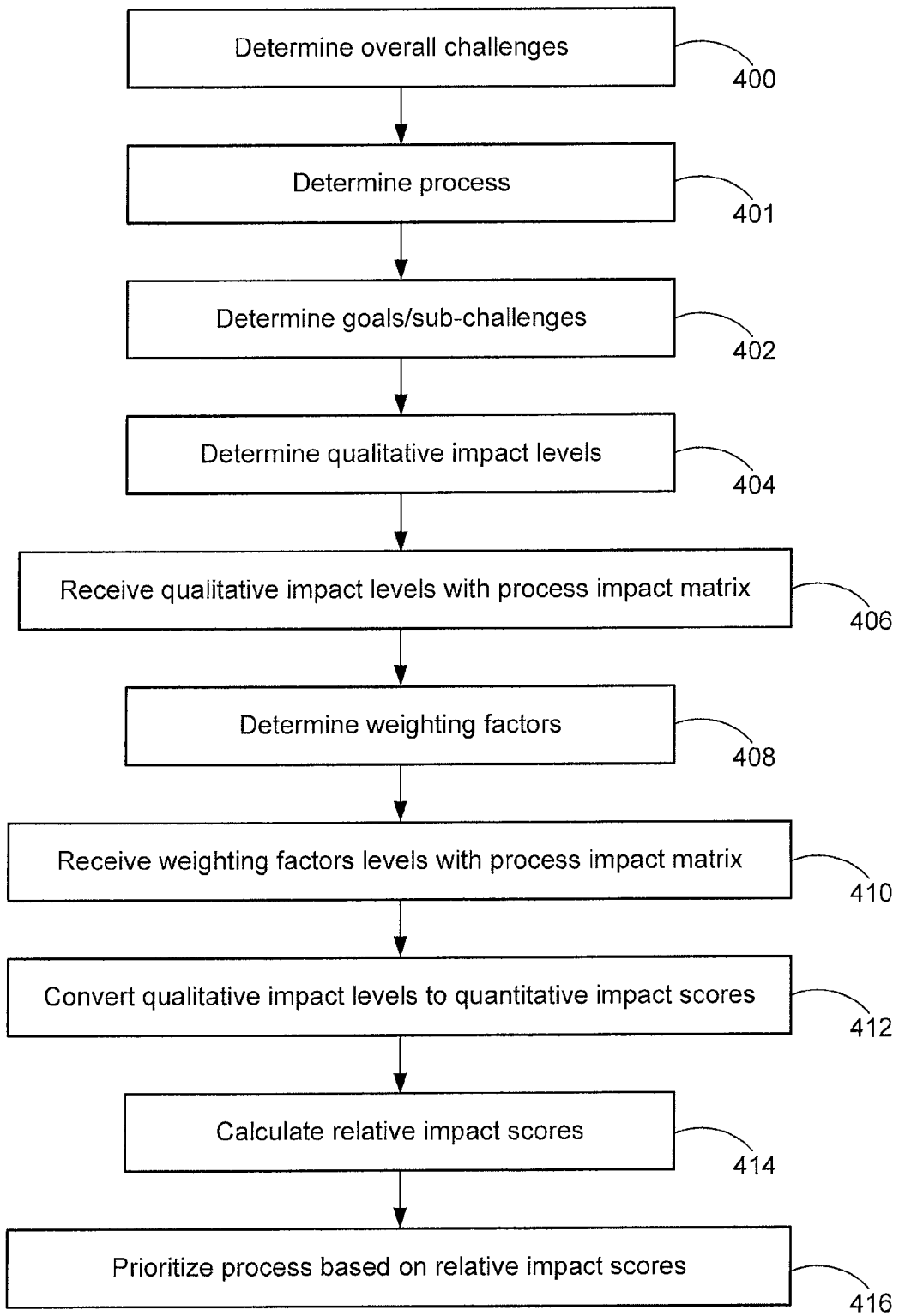

PROCESS IMPACT MATRIX DEVELOPMENT AND UTILIZATION

CROSS-REFERENCE TO RELATED APPLICATIONS

This application claims the benefit of priority from provisional patent application Ser. No. 61/482,078, filed on May 3, 2011, entitled Process Impact Matrix Development and Utilization. Application Ser. No. 61/482,078 is hereby incorporated by reference in its entirety.

BACKGROUND

1. Field of the Invention

The present invention relates generally to a system and method for determining and utilizing process impacts for an organization, and more particularly to a system and method for determining and utilizing the process impacts using a process impact matrix.

2. Related Art

Organizations, such as businesses, strive to accomplish various goals in order to achieve success in various areas. Such organizations may implement different processes in order to accomplish the various goals or meet various challenges. However, these organizations may not fully recognize the extent to which each process impacts the various goals and challenges. A full understanding of such impact may allow an organization to improve a level of success in accomplishing the various goals and meeting such challenges.

BRIEF SUMMARY

According to one aspect of the disclosure, a process impact matrix may be generated including one or more overall challenges of an organization. Each of the overall challenges may include one or more common or unique goals/sub-challenges. A plurality of processes that may be implemented by the organization may be included in the process impact matrix. An impact level may be determined indicative of an impact, or affect, a respective process has on each goal/sub-challenge. The impact levels may be converted to impact scores. A weighting factor indicative of a relative significance between each of the goals/sub-challenges may be used to scale the impact scores. The impact scores for each process may be used to determine a relative impact score indicative of an overall impact of each process with respect to the other processes. The relative impact scores may be used to prioritize the processes for subsequent analysis.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

FIG. 3 is an example of another process impact matrix.
FIG. 4 is an operational flow diagram of development and utilization of the example process impact matrix of FIG. 2.

DETAILED DESCRIPTION

Figure 1:
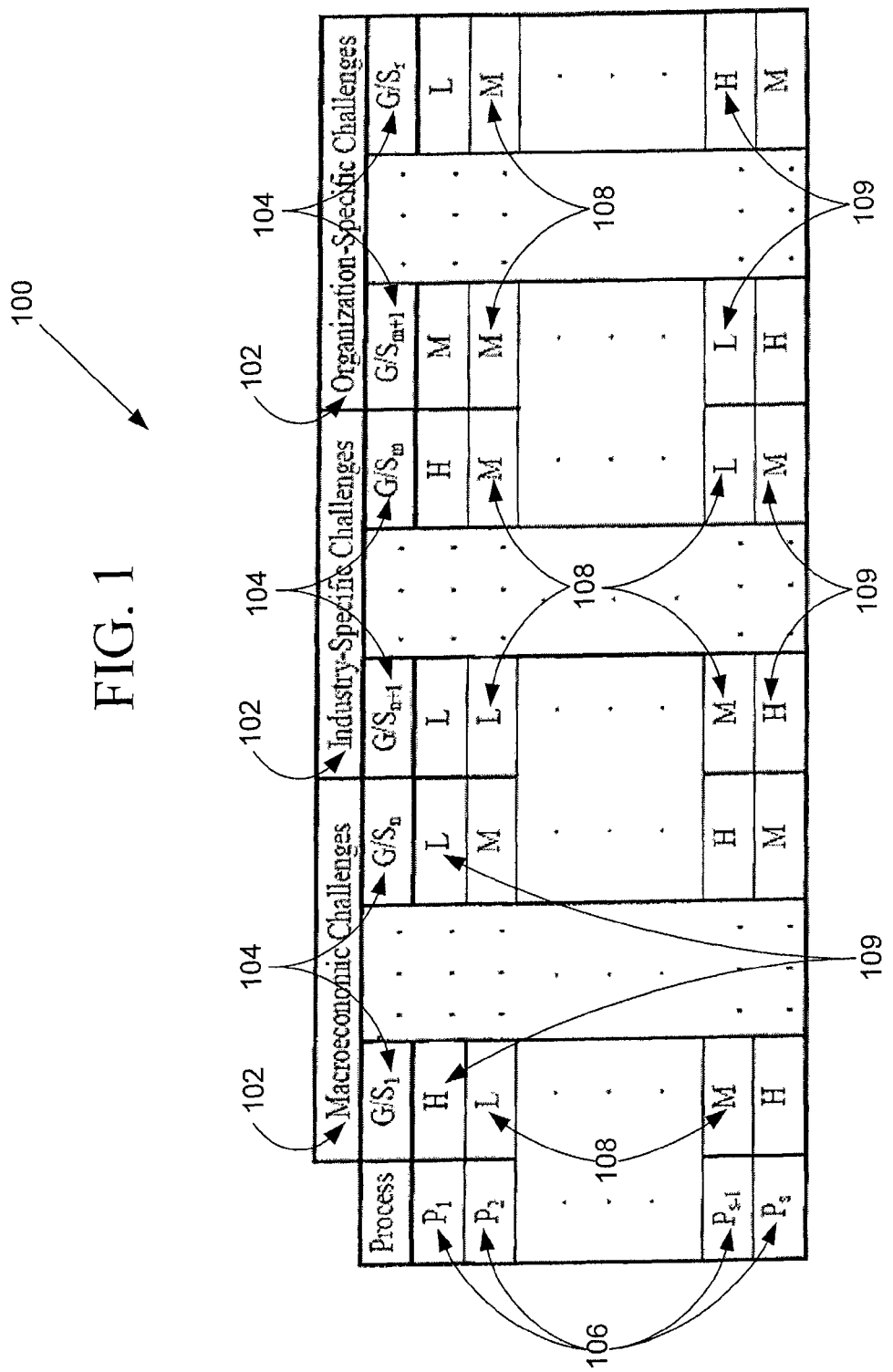
FIG. 1 is an example of a process impact matrix.

Organizations across various industries may implement various processes to accomplish various goals of the organization. A "Process" may refer to a way of executing any capability of the organization to achieve a result. Processes may also be referred to as "capabilities". Organizations may implement processes without fully recognizing the impact the processes may have in meeting various challenges to their particular goals. Fully recognizing such impacts may allow an organization to prioritize processes according to such impacts. Challenges an organization may address by implementing such processes may be broken down to allow various levels of such impacts to be identified and analyzed. For example, these challenges may be broken down into macroeconomic challenges, industry-specific challenges, and organization-specific challenges.

Macroeconomic challenges may refer to challenges an organization may face in order to be successful on a large-scale level, such as a global level. While macroeconomic challenges are based on large-scale considerations, such challenges may vary regionally. Examples of such macroeconomic challenges may be reduction of operating costs, and gaining access to emerging consumer markets.

Industry-specific challenges may refer to challenges an organization may face in order to be successful in a specific industry, such as oil refining, gas production, and energy retail, for example. Such challenges may be based on industrial trends and may vary based on numerous factors such as a particular industry segment and regional differences, but may typically apply to all organizations operating in a specific industry. Table 1 below provides several examples of industry-specific challenges for a number of different industries. Both the industries and industry-specific challenges listed are for purpose of example only and may include fewer or additional industries and industry-specific challenges.

TABLE 1

| Industry | Industry-Specific Challenge |
| --- | --- |
| Energy Upstream | Grow reserves |
|  | Balance mix of Energy sources |
|  | Increase efficiency of developing reserves |
|  | Optimize production |
| Energy Gas | Gain access to demand |
|  | Optimize production |
|  | Optimize supply chain |
|  | Increase operating margin |
| Energy Refining | Optimize production |
|  | Optimize supply chain |
|  | Increase operating margin |
| Energy Retail | Increase market share |
|  | Optimize offer portfolio |
|  | Optimize operating margin |

Organization-specific challenges may refer to challenges specific to a particular organization, such as specific needs of company shareholders or stakeholders, for example. Various organization-specific challenges may be considered such as increasing a share of a domestic market (e.g., to support local security of supply) and increasing share of gas production (e.g., to support a gas downstream business), for example.

An organization may have various goals and sub-challenges associated with these challenges. These goals and sub-challenges may be common to two or more of the challenges or may be unique with respect to a particular challenge. In order to identify which processes of an organization are most impactful regarding these goals and sub-challenges, and ultimately, the overall challenges (e.g., macroeconomic, industry-specific, and organization-specific) a process impact matrix may be generated.

FIG. 1 is an example of process impact matrix 100. The process impact matrix 100 may allow organization of various processes and how impactful each process is to a goal or sub-challenge.

The process impact matrix 100 may list each overall challenge 102 and each associated goal/sub-challenge (G/$S_x$) 104, where x is the $x^{th}$ goal/sub-challenge. In FIG. 1, there are a total of a number of "r" goals/sub-challenges 104, with the macroeconomic challenges having a number of "n" challenges, the industry-specific challenges having "m−(n+1)" challenges, and the organization-specific challenges having a number "r−(m+1)" goals/sub-challenges 104. However, a process 106 may be common among overall challenges 102 thus reducing the total number of different goals/sub-challenges 104. Each process ($P_x$) 106, where x is the $x^{th}$ process 106 and "s" is the total number of processes 106, may also be received by the process impact matrix 100. Each impact cell 108 may receive an impact level rating 109 indicating the level of impact that a particular process 106 has on each goal/sub-challenge 104. In one example, impact level rating 109 of each process 106 may be qualitatively expressed, such as that shown in FIG. 1. For example, the impact level rating 109 of each process 106 on each of the goals/sub-challenges 104 may be expressed as high ("H"), medium ("M"), or low ("L") impact. Determination of the impact rating level of a process 106 for a goal/sub-challenge 104 may be determined through various types of input.

Figure 2:
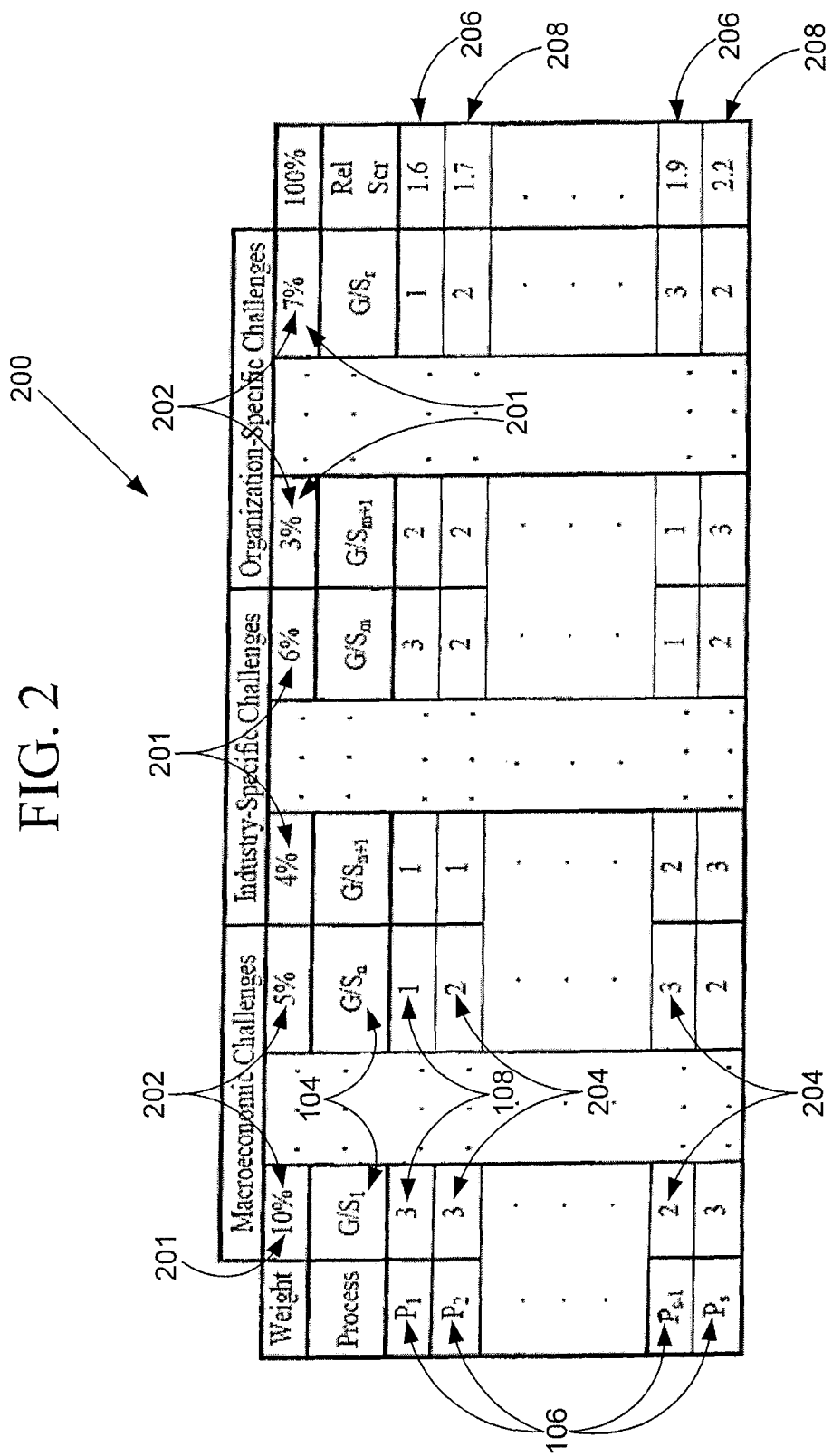
FIG. 2 is an example of another process impact matrix.

Once the process impact matrix 100 has been completed with the qualitative analysis, a quantitative conversion may be applied to generate the process impact matrix 200 as shown in FIG. 2. In one example, such quantitative conversion may include use of a relative weighting factor 201 of each goal/sub-challenge 104 as compared to one another. The weighting factor 201 may be expressed as a percentage and may indicate the overall importance of an associated goal/sub-challenge 104 with respect to all other goals/sub-challenges 104. The process impact matrix 200 may include a weighting factor cell 202 in which the weighting factor 201 of a particular goal/sub-challenge 104 may be received. In one example, as a boundary condition, the weighting factors 201 add up to 100% when all summed together.

Additionally, the qualitative impact level rating 109 of the process impact matrix 100 may be converted to a quantitative impact level score 204. In the example of FIG. 2, "high" impact may be converted to three, "medium" impact may be converted to 2, and "low" impact may be converted to 1. Alternatively, other conversion scales may be used. Upon completing the conversion, each process 106 may be given a relative impact score 206, which may be indicated in a relative score cell 208. The relative impact score 206 may indicate the overall relative impact of a process 106 compared to the other processes 106.

In the example of FIG. 2, the relative impact score 206 for each process 106 may be calculated as the total sum of each weighted quantitative impact level. For example, in FIG. 2, the quantitative impact level score 206 for process $P_1$ may include a weighted sum of (0.01)*3+ . . . +(0.05)*1+(0.04)*1+ . . . +(0.06)*3+(0.03)*2+ . . . +(0.07)*1 to equal over overall relative score of 1.6.

Process impact matrices, such as those shown in FIGS. 1 and 2 may be developed using macroeconomic challenges and industry-specific challenges predetermined prior to being used for a particular organization. Such a predetermination can be made because regardless of which particular organization is being evaluated, the macroeconomic challenges and industry-specific challenges may be common. However, the organization-specific challenges may be determined based on the specific details of a particular organization.

FIG. 3 is another example of a portion of a process impact matrix 300 illustrating a multi-tiered process hierarchy with scoring for only customer-specific challenges ("CLIENT Value Drivers"). As shown in FIG. 3, there may be multi-levels used to organize processes 302, expressed in FIG. 3 as the columns of Levels 1, 2, and 3. In order to obtain the most detailed information regarding process impact, the levels may be used in order to evaluate processes 302 at a desired level of detail. For example, both the processes "strategic planning" and "corporate development" are components of the "vision and strategy" process, which is in an intermediate process level. Similarly, the "vision and strategy" process and "external relationships" process are both part of the "management processes" which is a Level 1 category. In this example, evaluating process impacts of the Level 3 layer allows a greater level of detail than evaluating the process impacts of the Level 2 layer. However, evaluation at the Level 2 layer is an option, as is such evaluation at any existing layer of processes 302. In the example of FIG. 3, the sum of the weighting factors is shown as 67%. This is due to FIG. 3 only indicating the organization-based challenges. Thus the other 33% of the weighting factor may be attributed to the macroeconomic challenges and the industry-specific challenges not shown.

FIG. 4 is an example operational flow diagram of the development of the process impact matrix 200. Overall challenges 102 may be determined (400) and the processes 106 may be developed (401). The goals/sub-challenges 104 for each of the overall challenges 102 may also be determined (402), which may include associating each goal/sub-challenge 104 with one or more overall challenges 102. However, some overall challenges, such as macroeconomic and industry-specific, may be previously determined before being associated with a particular organization. The determination of overall challenges 102, processes 106, goals/sub-challenges 104 may include collection of information regarding the business scope of an organization, research for information on organization goals/challenges, collection of information of organization processes, and mapping of a footprint of the organization to previously established overall challenges 102, goals/sub-challenges 104, and processes 106, for example. Each process 106 may be evaluated to determine a qualitative impact level 109 of each goal/sub-challenge 104 (404).

The process impact matrix 200 may receive the qualitative impact levels (406). The weighting factors 201 may be determined (408) and the process impact matrix 200 may receive the determined weighting factors 201 (410). The qualitative impact levels 109 may be converted to quantitative impact scores 204 (412). Alternatively, the quantitative impact scores 204 may be input into the process impact matrix 200 directly bypassing the use of the qualitative impact levels 109. The relative impact scores 206 may be calculated for each process 106 (414). Upon determination of the relative impact scores 206, the processes 106 may be prioritized from highest to lowest relative impact score (416).

Figure 5:
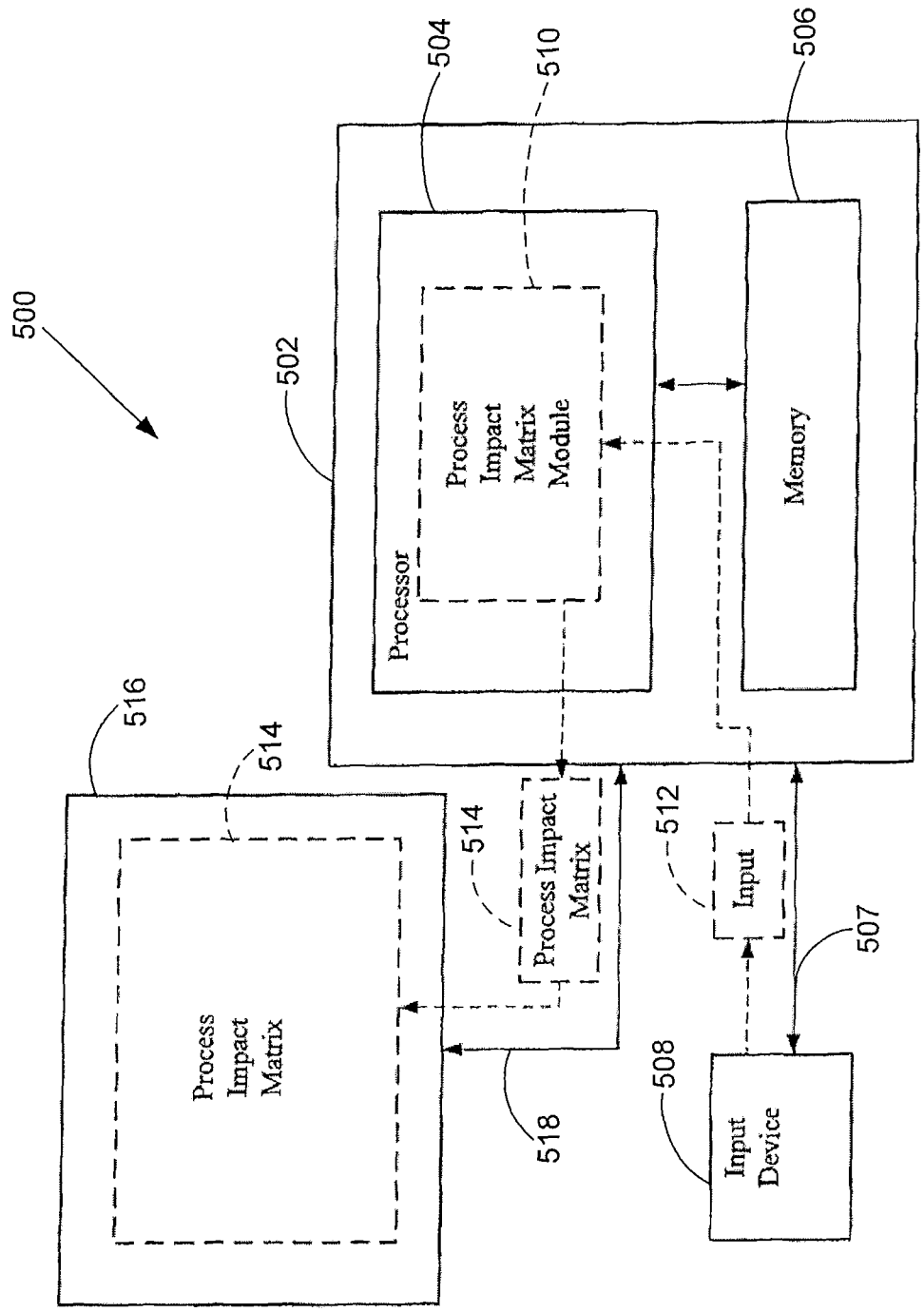
FIG. 5 is a block diagram of an embodiment of a computer system used for development and utilization of a process impact matrix.

FIG. 5 is a block diagram of a process analysis system 500. The process analysis system 500 may include a computer device 502 that includes a processor 504 and memory 506. The memory 506 may include one or more memories and may be non-transitory computer-readable storage media or memories, such as, for example, a cache, buffer, RAM, removable media, hard drive or other computer readable storage media. Computer readable storage media may include various types of volatile and nonvolatile storage media. Various processing techniques may be implemented by the processor 504 such as multiprocessing, multitasking, parallel processing and the like, for example. The processor 108 may include one or more processors. The computer device 502 may communicate with an input device 508 via a connection 509. The input device 506 may include one or more types of input devices such as, keyboards, mice, touch screen interfaces, voice-activated input, or any other suitable input device.

In one example, a process impact matrix module 510 may be stored in the memory 504 and executed by the processor 502. The term "module" may be defined to include a plurality of executable modules. As described herein, the modules are defined to include software, hardware or some combination thereof executable by the processor 106. Software modules may include instructions stored in the memory 506, or other memory device, that are executable by the processor 504 or other processor. Hardware modules may include various devices, components, circuits, gates, circuit boards, and the like that are executable, directed, and/or controlled for performance by the processor 504. The process impact matrix module 510 may receive input 512 from the input device 508 in order to generate the process impact matrix 514, which may include the forms similar to that shown in FIGS. 1-3. The process impact matrix module 510 may provide the process impact matrix 514 to a display 516 via a connection 518. The connections 507, 518 may be physical or wireless connections or some combination thereof. The connections 507, 508 may be private-network based, Internet-based, or any other suitable network configuration. The computer device 502 may be part of a network, allowing multiple input devices 508, which may include separate computer device/display/input device configurations to be used to access the process impact matrix module 510 in order to generate a process impact matrix 514.

In an embodiment, the processes 106 may be related to an objective of a particular organization or to a service that may be performed in order to accomplish the objective. These objectives may be the overall challenge 102 discussed above, or may be other challenges or objectives. The services may be the associated goal/sub-challenge 104 discussed above, or other goals or services related to an objective.

A service analysis tool may be included as part of the process analysis system. The service analysis tool may be stored in the memory 504 and executed by the processor 502. The service analysis tool may be executed to determine a "strength" of a service for accomplishing a particular objective to which the service is related. The service analysis tool may be configured to execute a first scoring module to process a matrix including process information related to processes associated with particular services and objectives to identify those processes for which challenges and objectives may be developed. The first scoring module may convert the process information of the matrix into a scoring matrix. The scoring matrix may include numerical scores indicative of particular attributes of each process ("process attribute"). The service analysis tool may execute a second scoring module to determine, for each service, average scores associated with one or more process attribute categories based on the scoring matrix. The service analysis tool may execute a third scoring module to determine an overall strength score for each service with respect to each objective. The overall strength score for each service may be based on the average scores. The service analysis tool may be further configured to determine, through execution of the first and second scoring modules, average scores associated with one or more process attribute categories associated with processes directly related to objectives.

Each process may be associated with various process information. The process information may be related to various process attributes. For example, each process may be associated with a plurality of process attributes (PA). Each process attribute (PA) may be associated with a predetermined process attribute category (ATT).

The process attribute category may represent a particular quality of a process. For example, one attribute category may be "Content Details," which may describe a level of development of a particular process based on predetermined criteria. Another example attribute category may be whether or not a "Capability Assessment Model" (CAM) is defined for a particular process. A CAM may be a specific model defining various capability levels uniformly applied to each process. Another example attribute category may be whether or not a particular process is associated with one or more "key performance indicators" (KPIs). In one example, KPI may be defined as particular metric or measure indicative of a level of success of a particular process.

As discussed above, the goal/sub-challenge 104 may be related to the services associated with an objective. The goal/sub-challenges 104 to be used in the process impact matrix 100 may be determined based on the strength of service(s) related to the goal/sub-challenge determined by the service analysis tool discussed above. The service analysis tool may be also further configured to identify the process attributes in the process attribute category of each process for improvement that maximizes an increase in the strength of services with respect to accomplishment of the objective.

The CAM discussed above may be a high performance capability assessment (HPCA) model. The HPCA model helps a business, such as an energy business, meet the challenges of the global marketplace by defining a scale of performance mastery along which the current practices of the business may be located. Thus, processes identified with the service analysis tool may be applied to accomplish an overall objective identified with the process impact matrix, and then evaluated with the CAM to determine a scale of performance mastery or capability of the business to perform the identified process.

The HPCA model includes a key factor dimension and a performance mastery scale dimension. The performance mastery scale dimension defines multiple mastery levels. The performance mastery levels form a scale of increasing organizational performance. The scale includes a 'Basic' mastery level, a 'Progressive' mastery level, a 'Leading' mastery level, and an 'Emerging' mastery level along a horizontal axis, and each of the four mastery levels in some capability areas may be further defined with three additional aspects, namely, procedures, people, and technology. Each performance mastery level includes criteria specific to a corresponding key assessment area. Each key assessment area identifies some aspect of a capability of an energy business.

A business capability can be defined as a bundle of closely integrated skills, knowledge, technologies, and cumulative learning that is exercised through a set of processes such as the processes 106 and that collectively represents an organization's ability to create value by producing outcomes and results. Capability may also be the processes 106. Capability areas do not represent a delineation of organizational responsibilities as the business outcomes of a capability may be the result of a number of cross-functional teams. Capabilities of a business, such as an energy business may be grouped into platforms. For example, the HPCA model groups the capabilities of the energy industry into three high-level platforms corresponding to an integrated oil and gas industry, which platforms may include a plan and manage enterprise platform, an operational business platform, and a support services platform. Platforms may include sub-platforms, as well as capabilities. For example, the operational business platform for a particular business, such as the energy business, may include sub-platforms, such as sub-platforms for exploration and production, gas, refining, marketing operations, hydrocarbon supply chain, and non-hydrocarbon supply chain. Each sub-platform may contain the capabilities.

The key factor dimension included in the HPCA model may establish a set of key assessment areas in which to analyze the capabilities of a business. Key assessment areas include performance capability criteria. Performance capability criteria populate the performance capability assessment model. The performance capability criteria may be specific to any one of many different business capabilities. For example, the exploration and production sub-platform (corresponding to the operational business platform) of an energy business includes performance capability criteria for exploration and appraisal, development, production, market and exploration, and operations support, at each of the capability levels along the performance capability scale dimension. Any number of performance capability assessment models and performance capability criteria may be defined and stored in a capability detail pool for subsequent retrieval and application to a business under examination. Accordingly, the HPCA model provides a flexible and adaptive scale of performance capability against which business practices may be compared to ascertain where the capabilities of a business under examination fall along the scale.

In an embodiment, the HPCA model establishes a multi-dimensional industry performance reference set, such as energy industry performance reference set, that includes multiple key assessment performance levels, further described below in reference Tables 2-5. The performance levels establish a scale of increasing effectiveness in delivery of each capability. The key assessment performance reference tables include a 'Basic' delivery level, a 'Progressive' delivery level, a 'Leading' delivery level, and an 'Emerging' delivery level. The performance levels establish a scale of mastery along which current business practices may be located and identified with respect to any platform and capability within a platform according to an analysis of performance capability criteria (PCC). The capability under evaluation may be assigned the performance level based on a delivery effectiveness position along the scale of mastery.

The 'Basic' delivery level specifies 'Basic' performance assessment criteria, the 'Progressive' delivery level specifies 'Progressive' performance assessment criteria, the 'Leading' delivery level specifies a 'Leading' performance assessment criteria, and the 'Emerging' delivery level specifies 'Emerging' performance assessment criteria. The HPCA model receives input data that specifies a business platform, such as an energy business platform (e.g., an energy industry area), and an industry key assessment area for analysis, such as an energy industry key assessment area. The HPCA model searches the multidimensional industry performance reference set for a matching key assessment performance reference table that match the business industry platform and corresponding industry capability within the platform and the industry key assessment area. In addition, the HPCA retrieves the matching key assessment performance reference table. The HPCA model may initiate analysis of the matching key assessment performance reference table to obtain a resultant performance assessment level for the industry key assessment area.

Tables 2-5 below provide an explanation of each of the capability delivery levels described above.

TABLE 2

'Basic' Delivery Level

| Description: | Capability mastery at a basic level indicates minimal evidence of proficiency or demonstration of this capability, the minimum to operate, typically highly manual operations, and likely increasing costs or a negative influence on revenue. |
|---|---|

TABLE 3

'Progressive' Delivery Level

| Description: | Capability mastery at a progressive level indicates an average proficiency or demonstration of this capability, with neutral effect on cost or revenue. |
|---|---|

TABLE 4

'Leading' Delivery Level

| Description: | Capability mastery at a leading level is more Leading than most other companies in the particular industry. Likely industrialized or standardized to a high degree, competitive strength for the company, and strong influence on reducing costs or increasing revenue. |
|---|---|

TABLE 5

'Emerging' Delivery Level

| Description: | Capability mastery at an emerging level indicates proactively incorporating business and IT trends into the operation driving competitive advantage through process or technology leadership. |
|---|---|

The capability under evaluation may be assigned a level of mastery based on the business' position along the scale of mastery (e.g. the 'basic,' 'progressive,' 'leading,' or 'emerging' delivery level). Performance criteria corresponding to the basic, progressive, leading, and emerging performance levels populate the HPCA model. The performance criteria capture characteristics, and/or other features of the delivery of a capability at particular performance level. Examples below illustrate performance criteria that provide analysis and bench marking for energy organizations. In other examples, performance criteria for other types of business organizations may be illustrated. The HPCA model performance criteria provide a tool for determining where a platform and capability under examination falls along the scale of mastery.

For example, business consultants and business process engineers may interview an energy business or receive data about the business to determine, measure, or otherwise ascertain the characteristics, criteria, and other features of a particular capability implemented within the business. The consultants and engineers may compare the characteristics of the business to the performance criteria in the HPCA model and arrive at an assessment level for the capability under examination. In doing so, for example, the consultants and engineers may identify where the capability under examination falls in terms of the performance level for each key assessment area of a capability and determine an overall position on the scale of mastery for the capability under examination. Performance criteria may populate the HPCA model in whole or in part. Multiple high performance capability assessments may be collected and stored with the performance criteria for future retrieval and possible modification in a capability detail pool.

Tables 6-8 show examples of portions of HPCA model for various performance criteria of an energy business:

TABLE 6

| | |
|---|---|
| Industry segment | Oil and Gas |
| Platform | Operational Business |
| Sub-platform | Operations Support |
| Capability | Logistics |
| Process | Logistics Planning |
| Activity/Event | Logistic Planning - Definition of KPIs and Integration of Activities |

| Capability Assessment Model | Basic | Progressive | Leading | Emerging |
|---|---|---|---|---|
| Procedures | Logistic requirements and activities are identified and executed on ad hoc basis and no performance indicators are defined.. | The level of proactive planning is low and most decisions are made based on reactive circumstances. No performance indicators are defined. In addition, supply chain planning activities are not integrated. | More proactive logistic planning with performance indicators defined. Supply chain planning activities are integrated internally; however, they are not integrated with service providers and material suppliers. | Proactive logistic planning with performance indicators defined assuring the achievement of the business requirements by foreseeing/planning each activity necessary. In addition, supply chain planning activities are integrated internally and with service providers and material suppliers. |
| People | | | | |
| Tools and Technology | | | | |

TABLE 7

| | |
|---|---|
| Industry segment | Oil and Gas |
| Platform | Operational Business |
| Sub-platform | Operations Support |
| Capability | Logistics |
| Process | Logistics Planning |
| Activity/Event | Roles and Responsibilities Definition - Interaction between Teams |

| Capability Assessment Model | Basic | Progressive | Leading | Emerging |
|---|---|---|---|---|
| Procedures | | | | |
| People | Roles and responsibilities are not defined. There is a poor interaction between different logistic areas and also between field and office teams. | Roles and responsibilities are still not defined. There is an awareness of the benefits of a better interaction between different logistic areas and between field and office teams. | Roles and responsibilities are still not defined. There is a better interaction between different logistic areas and also between field and office teams. | Roles and responsibilities are defined and there is a better interaction between different logistic areas and also between field and office teams. |
| Tools and Technology | | | | |

TABLE 8

| | |
|---|---|
| Industry segment | Oil and Gas |
| Platform | Operational Business |
| Sub-platform | Operations Support |
| Capability | Logistics |
| Process | Logistics Execution |
| Activity/Event | Demand Scheduling |

| Capability Assessment Model | Basic | Progressive | Leading | Emerging |
|---|---|---|---|---|
| Procedures | Each area has its own schedule; there is not an established process to perform demands prioritization and follow-up of their execution. | Each area has its own schedule and there is not an established process to perform demands prioritization and follow-up of their execution. Demands execution is tracked based on reactive circumstances only by field team | Each area has its own schedule and there is not an established process to perform demands prioritization. Meetings between field and office teams are held on a regular basis to monitor demands, however, there is still not an established process to follow-up demands execution. | Field activities are integrated in a single schedule, there is not an established process to perform demands prioritization and follow-up of their execution. In addition, meetings between field and office teams are held on a regular basis to monitor schedule. Thus, planning and control of field activities is improved and people-on-board are optimized. |
| People | | | | |
| Tools and Technology | | | | |

Figure 6:
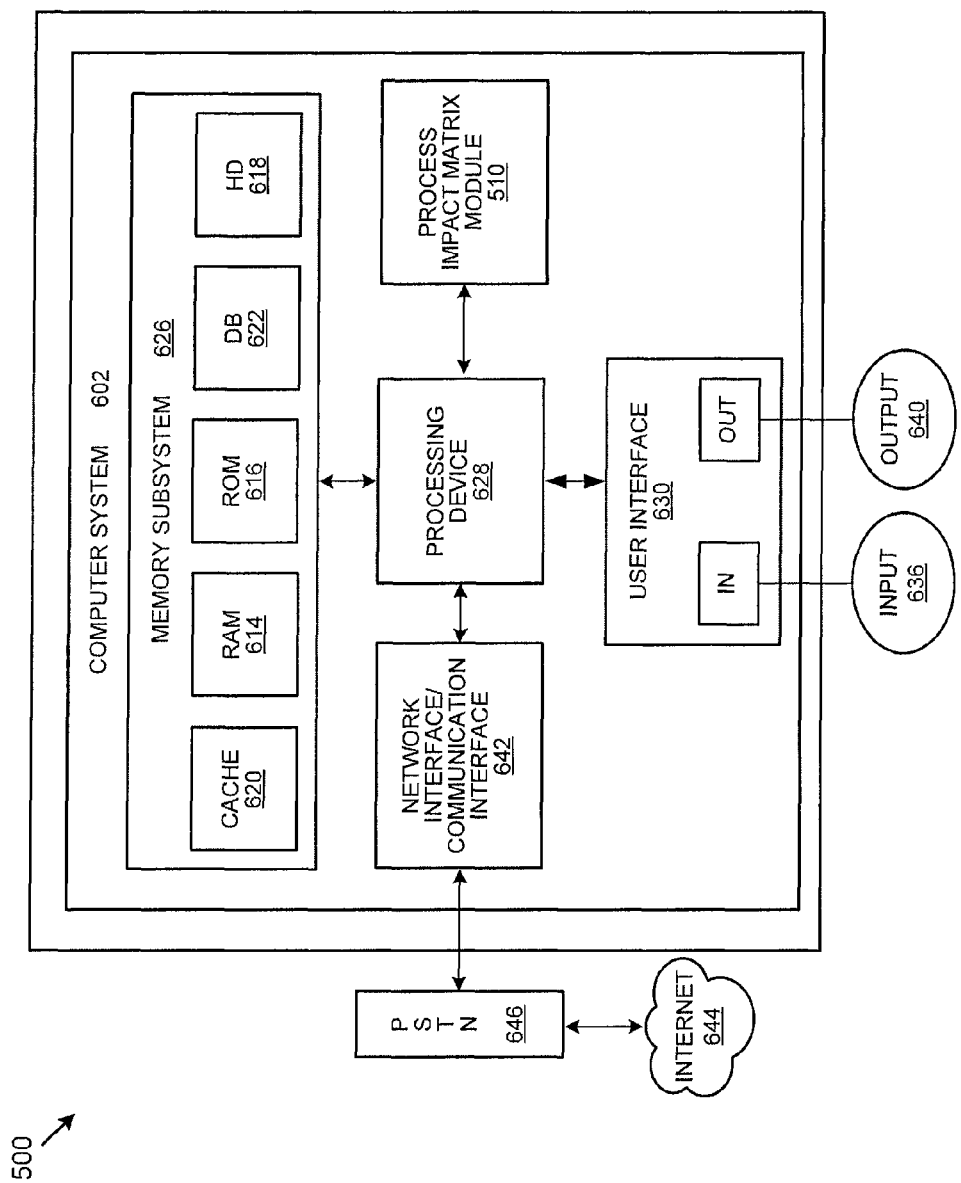
FIG. 6 is a block diagram of another embodiment of a computer system used for development and utilization of a process impact matrix.

FIG. 6 is a high-level hardware block diagram of another embodiment of the process analysis system 500. The process analysis system 500 may be embodied as a system cooperating with computer hardware components and/or as computer-implemented methods. The computer hardware components may include a computer or machine 602. The process analysis system 500 may include a plurality of subsystems or software modules, such as a process impact matrix module 510. The modules or subsystems may be implemented in hardware, software, firmware, or any combination of hardware, software, and firmware, and may or may not reside within a single physical or logical space. For example, the modules or subsystems referred to in this document and which may or may not be shown in the drawings, may be remotely located from each other and may be coupled by a communication network.

As shown in FIG. 6, the computer or machine 602 may be a personal computer or a server and may include various hardware components, such as RAM 614, ROM 616, hard disk storage 618, cache memory 620, database storage 622, and the like (also referred to as "memory subsystem 626"). The computer 602 may include any suitable processing device 628, such as a computer, microprocessor, RISC processor (reduced instruction set computer), CISC processor (complex instruction set computer), mainframe computer, work station, single-chip computer, distributed processor, server, controller, micro-controller, discrete logic computer, and the like, as is known in the art. For example, the processing device 628 may be an Intel Pentium® microprocessor, x86 compatible microprocessor, or equivalent device, and may be incorporated into a server, a personal computer, or any suitable computing platform.

The memory subsystem 626 may include any suitable storage components, such as RAM, EPROM (electrically programmable ROM), flash memory, dynamic memory, static memory, FIFO (first-in, first-out) memory, LIFO (last-in, first-out) memory, circular memory, semiconductor memory, bubble memory, buffer memory, disk memory, optical memory, cache memory, and the like. Any suitable form of memory may be used, whether fixed storage on a magnetic medium, storage in a semiconductor device, or remote storage accessible through a communication link. A user or system interface 630 may be coupled to the computer 602 and may include various input devices 636, such as switches selectable by the system manager and/or a keyboard. The user interface also may include suitable output devices 640, such as an LCD display, a CRT, various LED indicators, a printer, and/or a speech output device, as is known in the art.

To facilitate communication between the computer 602 and external sources, a communication interface 642 may be operatively coupled to the computer system. The communication interface 642 may be, for example, a local area network, such as an Ethernet network, intranet, Internet, or other suitable network 644. The communication interface 642 may also be connected to a public switched telephone network (PSTN) 646 or POTS (plain old telephone system), which may facilitate communication via the Internet 644. Any suitable commercially-available communication device or network may be used.

The logic, circuitry, and processing described above may be encoded or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for examples, instructions for execution by a processor, controller, or other processing device.

The medium may be implemented as any device that contains, stores, communicates, propagates, or transports executable instructions for use by or in connection with an instruction executable system, apparatus, or device. Alternatively or additionally, the logic may be implemented as analog or digital logic using hardware, such as one or more integrated circuits, or one or more processors executing instructions; or in software in an application programming interface (API) or in a Dynamic Link Library (DLL), functions available in a shared memory or defined as local or remote procedure calls; or as a combination of hardware and software.

In other implementations, the logic may be represented in a signal or a propagated-signal medium. For example, the instructions that implement the logic of any given program may take the form of an electronic, magnetic, optical, electromagnetic, infrared, or other type of signal. The systems described above may receive such a signal at a communication interface, such as an optical fiber interface, antenna, or other analog or digital signal interface, recover the instructions from the signal, store them in a machine-readable memory, and/or execute them with a processor.

The systems may include additional or different logic and may be implemented in many different ways. A processor may be implemented as a controller, microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instructions may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A computer-implemented method for high performance capability assessment of an oil and gas business, comprising:
    defining, by a processor coupled to a machine-readable memory, a multidimensional oil and gas industry performance reference set stored in the memory and comprising multiple key assessment performance reference tables, at least one key assessment performance reference table further defining an operational business platform, including:
        a 'Basic' performance level specifying 'Basic' performance assessment criteria;
        a 'Progressive' performance level specifying 'Progressive' performance assessment criteria;
        a 'Leading' performance level specifying 'Leading' performance assessment criteria; and
        an 'Emerging' performance level specifying 'Emerging' performance assessment criteria;
    establishing operational business performance assessment criteria,
        wherein the 'Basic' performance assessment criteria includes a first criteria where logistic requirements and activities are identified and executed on an ad hoc basis;
        wherein the 'Progressive' performance assessment criteria includes a first criteria where a level of proactive planning is very low and decisions are made based on reactive circumstances;
        wherein the 'Leading' performance assessment criteria includes a first criteria where proactive logistic planning with performance indicators are defined;
        wherein the 'Emerging' performance assessment criteria includes a first criteria where proactive logistic planning with performance indicators are defined assuring the achievement of the business requirements by foreseeing and planning each activity necessary;

receiving, through a communication interface coupled to the processor, an input specifying an oil and gas industry area and an oil and gas industry key assessment area with the oil and gas industry area for analysis;

searching, by the processor, the multidimensional oil and gas industry performance reference set for a matching key assessment performance reference table that matches the oil and gas industry area and the oil and gas industry key assessment area;

retrieving, by the processor, the matching key assessment performance reference table;

analyzing, by the processor, the matching key assessment performance reference table;

obtaining, by the processor, a resultant performance level for the oil and gas industry key assessment area;

determining an objective associated with an organization of the oil and gas industry area;

determining a service associated with the objectives;

determining a plurality of processes capable of being performed by the organization;

identifying a subset of processes associated with the service from the plurality of processes;

determining an overall strength score based on the subset of processes, wherein the overall strength score is representative of the strength of the service with respect to the objective;

generating a process impact matrix indicating respective impact levels for each process, wherein each respective impact level is indicative of an impact of each process on the overall strength score;

converting each respective impact level to an impact level score;

determining, for each of the plurality of processes, a relative impact score based on the respective impact levels; and prioritizing each process based on the relative impact scores.

2. The method of claim 1, wherein: the respective impact levels are qualitative;
the impact level score is quantitative;
the relative impact score for each of the plurality of processes is quantitative;
converting each respective impact level to the impact level score further comprises applying a relative weighting to each of the impact level scores for each of the plurality of goals or challenges; and
determining the relative impact score is further based on the relative weighting applied to each of the plurality of goals or challenges.

3. The method of claim 2, further comprising:
determining a weighted quantitative impact level for each of the plurality of goals or challenges by multiplying the respective impact level by the relative weighting for each of the plurality of goals or challenges; and
wherein the relative impact score for each of the plurality of processes is determined by summing the weighted quantitative impact levels for all of the plurality of goals or challenges.

4. The method of claim 2, wherein the goals or challenges comprise macroeconomic challenges, industry specific challenges, and organization specific challenges.

5. The method of claim 2, wherein each of the plurality of processes is a multi-tiered process, and the process impact matrix further indicates respective impact levels for each tier of each process.

6. The method of claim 2, wherein converting each respective impact level to the impact level score further comprises applying a predetermined conversion scale the respective impact level.

7. The method of claim 1, further including a plan and manage platform, or a support services platform.

8. The method of claim 7, wherein the industry key assessment area is procedures, people, or technology.

9. A system for high-performance capability assessment of an oil and gas business, the system comprising:
a processor operatively coupled to a communication network;
an interface coupled to the processor and configured to receive input;
the processor configured to access a machine-readable memory;
the memory including a multidimensional oil and gas industry performance reference set comprising multiple key assessment performance reference tables, at least one key assessment performance reference table defining an operational business platform, including:
a 'Basic' performance level specifying 'Basic' performance assessment criteria;
a 'Progressive' performance level specifying 'Progressive' performance assessment criteria;
a 'Leading' performance level specifying 'Leading' performance assessment criteria;
an 'Emerging' performance level specifying 'Emerging' performance assessment criteria;
the processor establishing operational business assessment criteria,
wherein the 'Basic' performance assessment criteria includes a first criteria where logistic requirements and activities are identified and executed on an ad hoc basis;
wherein the 'Progressive' performance assessment criteria includes a first criteria where a level of proactive planning is very low and most decisions are made based on reactive circumstances;
wherein the 'Leading' performance assessment criteria includes a first criteria where proactive logistic planning with performance indicators are defined;
wherein the 'Emerging' performance assessment criteria includes a first criteria where proactive logistic planning with performance indicators are defined assuring the achievement of the business requirements by foreseeing and planning each activity necessary;
the processor configured to receive an input specifying an oil and gas industry area and an oil and gas industry key assessment area with the oil and gas industry area for analysis;
the processor configured to search the multidimensional oil and gas industry performance reference set for a matching key assessment performance reference table that matches the oil and gas industry area and the oil and gas industry key assessment area, and retrieve the matching key assessment performance reference table;
the processor configured to analyze the matching key assessment performance reference table, and obtain a resultant performance level for the oil and gas industry key assessment area;
the processor further configured to:
determine an objective associated with an organization of the oil and gas industry area;
determine a service associated with the objectives;

determine a plurality of processes capable of being performed by the organization;
identify a subset of processes associated with the service from the plurality of processes;
determine an overall strength score based on the subset of processes, wherein the overall strength score is representative of the strength of the service with respect to the objective;
generate a process impact matrix indicating respective impact levels for each process, wherein each respective impact level is indicative of an impact of each process on the overall strength score;
convert each respective impact level to an impact level score;
determine, for each of the plurality of processes, a relative impact score based on the respective impact levels; and
prioritize each process based on the relative impact scores.

10. The system of claim 9, further comprising:
a process impact matrix module stored in the machine-readable memory having data corresponding to prioritization of processes of an organization, the machine-readable memory comprising program instructions that cause the processor to:
determine a plurality of processes capable of being performed by the organization;
determine a plurality of goals or challenges associated with the organization;
generate, on a user interface, a rendering of a process impact matrix indicating respective impact levels for each process, wherein each respective impact level is indicative of an impact of each process on each of the plurality of goals or challenges;
convert each respective impact level to an impact level score;
determine, for each of the plurality of processes, a relative impact score based on the respective impact levels; and
prioritize each process based on the relative impact scores.

11. The system of claim 10, wherein:
the respective impact levels are qualitative;
the impact level score is quantitative;
the relative impact score for each of the plurality of processes is quantitative;
converting each respective impact level to the impact level score further comprises applying a relative weighting to each of the impact level scores for each of the plurality of goals or challenges; and
determining the relative impact score is further based on the relative weighting applied to each of the plurality of goals or challenges.

12. The system of claim 11, wherein the process impact matrix comprises a plurality of impact cells, each impact cell to receive an input of one respective impact level for each process.

13. The system of claim 12, wherein the process impact matrix further comprises a plurality of weighting factor cells, each weighting factor cell to receive an input of one relative weighting for each of the impact level scores.

14. The system of claim 11, wherein the process impact matrix further causes the processor to determine a weighted quantitative impact level for each of the plurality of goals or challenges by multiplying the respective impact level by the relative weighting for each of the plurality of goals or challenges; and
wherein the processor determines the relative impact score for each of the plurality of processes is by summing the weighted quantitative impact levels for all of the plurality of goals or challenges.

15. The system of claim 10, wherein the goals or challenges comprise macroeconomic challenges, industry specific challenges, and organization specific challenges.

16. The system of claim 10, wherein each of the plurality of processes is a multi-tiered process, and the process impact matrix further indicates respective impact levels for each tier of each process.

17. The system of claim 9, further including a plan and manage platform, a support services platform, or an operations support sub-platform.

18. The system of claim 17, wherein the industry key assessment area is procedures, people, or technology.

* * * * *